United States Patent [19]
Booher et al.

[11] 3,859,354
[45] Jan. 7, 1975

[54] PREPARATION OF 1-METHYL-3,3-DIPHENYL-4-HYDROXYHEXYLAMINE SALTS AND O-ACYL DERIVATIVES THEREOF

[75] Inventors: Richard N. Booher; Albert Pohland, both of Indianapolis, Ind.

[73] Assignee: Eli Lilly and Company, Indianapolis, Ind.

[22] Filed: Dec. 26, 1972

[21] Appl. No.: 317,969

[52] U.S. Cl.......... 260/570 R, 260/488 R, 260/490, 260/501.18, 260/618 R
[51] Int. Cl............................................. C07c 85/00
[58] Field of Search............................ 260/570, 490

[56] References Cited
OTHER PUBLICATIONS

Rawalay et al, "Journal Organic Chemistry," Vol. 32, page 3,129–3,131 (1967).

*Primary Examiner*—Robert V. Hines
*Attorney, Agent, or Firm*—James L. Rowe

[57] ABSTRACT

1-Methyl-3,3-diphenyl-4-hydroxyhexylamine, its salts and O-acyl derivatives, are prepared via a novel nitro intermediate formed by the neutral permanganate oxidation of normethadol or of a noracymethadol.

4 Claims, No Drawings

PREPARATION OF 1-METHYL-3,3-DIPHENYL-4-HYDROXYHEXYLAMINE SALTS AND O-ACYL DERIVATIVES THEREOF

BACKGROUND OF THE INVENTION

Rawalay and Shechter, *J. Org. Chem.*, 32, 3129 (1967) discuss the oxidation of primary, secondary and tertiary amines, all containing a hydrogen on the carbon α to the nitrogen, with neutral permanganate to yield the corresponding aldehydes and/or ketones. For example, they state that methylamine and dimethylamine yield formaldehyde; propylamine yields propionaldehyde; benzylamine yields benzaldehyde; cyclobutylamine yields cyclobutanone; α-phenylethylamine, yields acetophenone; and 2-heptylamine yields 2-heptanone. Oxidation products containing a nitro group are not disclosed.

The classical method for synthesizing primary aliphatic amines was the Gabriel synthesis which involved the alkylation of potassium phthalimide followed by hydrolysis of the phthalate group. Reduction of an aliphatic nitro compound with a metal in hydrochloric acid or other strong acid was also used to prepare primary aliphatic amines. The difficulty with this latter synthesis as a general synthetic procedure, however, was the lack of an unambiguous synthesis of the starting nitro compound. With the advent of the more powerful reducing agents, such as lithium aluminum hydride, primary aliphatic amines are now prepared directly by the reduction of the corresponding amide or ketone and aldehyde derivatives such as the oxime and hydrazone. Again, the difficulty of preparing the ketone, aldehyde or acid whose nitrogen derivatives can be reduced by lithium aluminum hydride to yield a primary amine limits the applicability of this newer synthetic method. The procedure of Rawalay and Shechter (supra) is a method of obtaining unambiguously a particular aldehyde or ketone by the oxidation of an amine compound containing the desired carbon skeleton. The ketone or aldehyde can then be converted theoretically to the corresponding primary amine by forming an oxime and reducing this derivative with lithium aluminum hydride.

SUMMARY OF THE INVENTION

This invention provides a method of synthesizing primary amines related to normethadol and noracymethadol which comprises oxidizing a compound of formula I

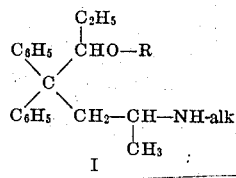

wherein R is H or

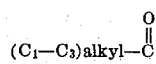

and alk is $(C_1-C_3)$alkyl, in neutral permanganate to yield a nitro compound of formula II

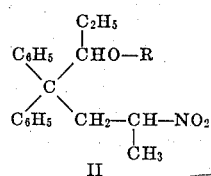

wherein R has the same meaning as before; and then reducing said nitro compound with a metal and acid to yield the corresponding primary amine (formula III)

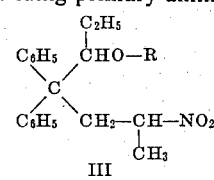

wherein R has the same meaning as hereinabove, or with lithium aluminum hydride to yield the primary amine of formula III wherein R is hydrogen only. Alternatively, a compound according to formula III wherein R is hydrogen can be prepared by hydrolyzing with acid a compound according to formula III wherein R is

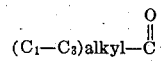

prepared by a metal-acid reduction.

All of the compounds illustrated by Formulas I-III have two asymmetric centers and can thus exist in four diastereoisomeric forms occurring as two racemic pairs, the α-dl racemate (the less soluble) and the β-dl racemate (the more soluble racemate). Preparation of pure optical isomers can readily be carried out by initiating the synthesis with, for example, an α-d or α-l isomer, both of which isomers are available from the prior art by applying the azodicarboxylate oxidation procedure of U.S. Pat. No. 3,213,128 to an α-l-acylmethadol or an α-d-acylmethadol. The α-d and α-l-normethadols are prepared from the corresponding acyl derivatives by hydrolysis.

The compounds prepared by the methods of this invention (Formula III) are useful as analgesics as set forth in the applications of Billings, McMahon, and Pohland, Ser. No. 317,970 and of Due and Sullivan, Ser. No. 317,912, both filed this even date herewith.

In carrying out our novel reaction, a noracymethadol (formula I above) is oxidized by potassium permanganate in aqueous solution at substantially neutral pH. The neutrality of this solution is maintained by means of a buffering agent such as calcium sulphate although other systems available for maintaining the pH of aqueous solutions at pH = 7 or thereabouts can be employed, such buffering agents and systems being well known in the art. The preferred solvent for the reaction is a mixture of t-butanol and water, but other water-miscible solvents which are not subject to oxidative attack by permanganate can also be used, such solvents including acetone, methylethylketone, t-amylalcohol and the like. The second step of our novel process involves the reduction of the nitroheptane (Formula II) produced by the permanganate oxidation step. In this reduction, any of the common reducing agents such as a metal and a strong acid or lithium aluminum hydride or other metal hydride can be utilized, although the products of the reduction differ depending on the reducing agent used. Such reducing systems as iron and hydrochloric acid or acetic acid, tin and hydrochloric acid, zinc and hydrochloric acid or acetic acid, and the like may be conveniently employed. During the reduction of the nitro compound prepared from a noracymethadol starting material, using a metal and an acid as a reducing agent, the reduction can be interrupted so as to preserve the integrity of the acyl group. The product thus isolated from the reaction mixture is the O-acyl primary amine derived from the nor acymethadol. However, if the reduction is carried out for an extended period of time and in the presence of an aqueous mineral acid, the acyl group will be subject to hydrolysis, and the product of the reaction will be the primary amine derived from the normethadol itself. When utilizing a metal hydride such as lithium aluminum hydride as the reducing agent, the primary amine derived from the normethadol is the product of the reaction regardless of whether the nitro compound from a normethadol or a noracymethadol is utilized as a starting material since the metal hydride reduces the acyl group to an alcohol group under the reaction conditions. Sufficient excess metal hydride must be employed to provide for the additional reduction of the acyl group.

Other methods of reducing a nitro compound to the corresponding amine are set forth in such texts as Groggins, *Unit Processes Inorganic Synthesis*, Chapter on Animation by Reduction (McGraw-Hill Book Company York P. A. 1938), and these methods can be used in place of those delineated above without affecting the nature of the reaction product.

Starting materials useful in the synthetic procedures of this invention are readily prepared by methods available in the art. Compounds according to Formula I above are prepared by following a standard methadone synthesis except that an alkylbenzylamine (Formula IV) is employed in place of the usual dimethylamine of the methadone synthesis.

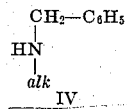

The N-benzyl-N-($C_1$-$C_3$)alkyl 4,4-diphenyl-6-amino-3-heptanone thus prepared is reduced to the methadol derivative, catalytically or by a metal alcoholate, optionally acylated, and then debenzylated using standard procedures to yield a normethadol or a noracymethadol.

This invention is further illustrated by the following specific examples.

EXAMPLE 1

Preparation of α-dl-5-Acetoxy-4,4-diphenyl-2-nitroheptane

About 19.5 g. of α-dl-acetylnormethadol hydrochloride were dissolved in water, and the acidic aqueous solution made basic. α-dl-Acetylnormethadol free base, being insoluble in the alkaline aqueous layer, separated and was extracted into ether. The ether layer was separated, dried, and the ether removed by evaporation in vacuo. α-dl-Acetylnormethadol free base remaining as a residue was dissolved in 200 ml. of t-butanol, and the butanol solution added at a temperature of about 50° C. to a solution containing 23.7 g. of potassium permanganate and 12.9 g. of calcium sulfate dihydrate in 300 ml. of t-butanol plus 500 ml. of water. The reaction mixture was stirred at about 50° C. for 30 minutes and then cooled. The reaction mixture was made acidic by the addition of an excess of 12 N-hydrochloric acid. Sodium bisulfite was added to reduce any remaining manganese dioxide or other oxidizing agent present. The resulting reaction mixture was extracted twice with 500 ml. of ether. The ethereal solution was separated and washed successively with 10 percent aqueous hydrochloric acid, water, saturated aqueous bicarbonate and water. The ether layer was dried, and the ether removed by evaporation in vacuo, leaving as a residue 17 g. of a neutral oil containing α-dl-5-acetoxy-4,4-diphenyl-2-nitroheptane. The oil was chromatographed over silica gel using a 1:9 ethylacetate-benzene solvent mixture as the eluant. Fractions shown to contain a fast moving component by thin layer chromatography were pooled, and the solvent evaporated therefrom in vacuo, yielding as a residue 7 g. of an oil which crystallized readily from an ether-hexane solvent mixture. α-d l-5-acetoxy-4,4-diphenyl-2-nitroheptane thus prepared melted at about 126°–7° C. after recrystallization from hexane.

Analysis: Calc: C, 70.96; H, 7.09; N, 3.94; O, 18.01
Found: C, 70.96; H, 7.30; N, 3.85; O, 18.13

α-dl-Normethadol can be oxidized with neutral Permanganate by the above procedure to yield α-dl-4,4-diphenyl-5-hydroxy-2-nitrohexane.

EXAMPLE 2

Preparation of α-dl-4-Acetoxy-1-methyl-3,3-diphenylhexylamine

A mixture containing 2.85 g. of α-dl-5-acetoxy-4,4-diphenyl-2-nitroheptane and 5 g. of iron powder was prepared in 50 ml. of ethanol. 100 ml. of 5N hydrochloric acid were added to the ethanol solution in dropwise fashion with stirring. After the addition had been completed, the reaction mixture was heated at refluxing temperature for an additional 2 hours and was then allowed to stand overnight at room temperature. The ethanol was removed therefrom in vacuo, and the aqueous solution remaining was made basic with cold 10 percent aqueous sodium hydroxide. α-dl-4-Acetoxy-1-methyl-3,3-diphenylhexylamine formed in the above reaction, being insoluble in the alkaline aqueous layer, separated and was twice extracted with 300 ml. portions of ether. The ether extracts were combined, and the combined extracts washed with water. The ether extracts were contacted with an excess of 10 percent aqueous hydrochloric acid, the hexylamine passing into the acidic layer. The acidic aqueous layer was separated and then made basic with 14 N aqueous ammonium hydroxide. The hexylamine free base separated and was extracted into 300 ml. of ether. The ether extract was separated, washed with water and dried. Removal of the ether in vacuo yielded an oil comprising α-dl-4-acetoxy-1-methyl-3,3-diphenylhexylamine. The oil was dissolved in ether, and an excess of maleic acid in ether added thereto, thus forming α-dl-4-acetoxy-1-methyl-3,3-diphenylhexylamine maleate which crystallized and was separated by filtration. The maleate salt melted at about 165°–6° C. after recrystallization from a methanolethyl acetate solvent mixture.

Analysis: for, $C_{21}H_{27}NO_2 \cdot C_4H_4O_4$ (441.524)
Calc: C, 68.01; H, 7.08; N, 3.17; O, 21.74
Found: C, 68.24; H, 7.31; N, 3.16; O, 22.03

The same compound is produced using glacial acetic acid in place of hydrochloric acid in the above reduction.

EXAMPLE 3

Preparation of α-dl-1-Methyl-3,3-diphenyl-4-hydroxyhexylamine

A mixture containing 3.00 g. of α-dl-5-acetoxy-4,4-diphenyl-2-nitroheptane, 100 ml. of ethanol, 100 ml. of 5N aqueous hydrochloric acid and 5 g. of iron powder was prepared. The reaction mixture was heated to refluxing temperature for about eight hours with stirring. The reaction mixture was cooled to room temperature, and the ethanol removed in vacuo. An excess of 10 percent aqueous sodium hydroxide was added. α-dl-1-Methyl-3,3-diphenyl-4-hydroxyhexylamine formed in the above reaction, being insoluble in the aqueous alkaline layer, separated and was extracted into ether. The ether layer was separated, and the alkaline layer again extracted with ether. The separated ether layers were combined, and the combined layers washed once with water. The ether layer was then extracted with an excess of 10 percent aqueous hydrochloric acid, during which operation the primary amine formed in the above reaction passed into the acidic layer. The ether layer was discarded. The aqueous layer was made basic with 14 N aqueous ammonium hydroxide. α-dl-1-Methyl-3,3-diphenyl-4-hydroxyhexylamine, being insoluble in the alkaline layer, separated and was extracted into 300 ml. of ether. The alkaline layer was again extracted with ether. The ether extracts were combined, washed once with water, dried, and the ether removed therefrom by evaporation in vacuo, yielding as a residue about 0.5 g. of an oil comprising α-dl-1-methyl-3,3-diphenyl-4-hydroxyhexylamine. The residual oil was dissolved in ether, and an excess of gaseous anhydrous hydrogen chloride was passed into the ethereal solution, thus forming α-dl-1-methyl-3,3-diphenyl-4-hydroxyhexylamine hydrochloride which was separated by filtration and melted at about 182° C. with decomposition.

Analysis: for $C_{19}H_{25}NO \cdot HCl$
Calc: C, 71.34; H, 8.19; N, 4.38
Found: C, 71.60; H, 8.09; N, 4.06

EXAMPLE 4

Alternate preparation of α-dl-1-methyl-3,3-diphenyl-4-hydroxyhexylamine

A solution of 3.5 g. of α-dl-3-acetoxy-4,4-diphenyl-6-nitroheptane in 100 ml. of tetrahydrofuran (THF) was added in dropwise fashion with stirring to a solution of 0.76 g. of lithium aluminumhydride in 100 ml. of THF. After the addition had been completed, the reaction mixture was stirred at room temperature overnight. An excess of saturated aqueous ammonium chloride was added cautiously to the reaction mixture in order to decompose any excess lithium aluminum hydride present as well as inorganic salts. The reaction mixture was then filtered, and the filtrate extracted twice with 100 ml. of ether. The ether extracts were combined and contacted with 10 percent aqueous hydrochloric acid. α-dl-1-Methyl-3,3-diphenyl-4-hydroxyhexylamine being soluble in the acidic aqueous solution passed into that solution. The ether layer was separated and discarded. The acidic aqueous layer was then made basic with an excess of 14 N ammonium hydroxide. α-dl-1-methyl-3,3-diphenyl-4-hydroxyhexylamine, being insoluble in the alkaline aqueous layer separated and was extracted into ether. The ether extract was separated, washed once with water and dried. Evaporation of the ether in vacuo yielded about 0.9 g. of α-dl-1-methyl-3,3-diphenyl-4-hydroxyhexylamine as an oil. The oil was dissolved in ether and an excess of maleic acid in ether added thereto, thus forming α-dl-1-methyl-3,3-diphenyl-4-hydroxyhexylamine maleate which was separated by filtration and melted at about 156°-8° C. after recrystallization from a methanol-ethyl acetate solvent mixture.

Analysis: for $C_{19}H_{25}NO \cdot C_4H_4O_4(399.487)$
Calc: C, 69.15; H, 7.32; N, 3.51; O, 20.00
Found: C, 69.12; H, 7.41; N, 3.21; O, 19.89

Reduction of α-dl-4,4-diphenyl-5-hydroxy-2-nitroheptane by the procedure of either Example 3 or Example 4 yields α-dl-1-methyl-3,3-diphenyl-4-hydroxyhexylamine, isolated and purified as the maleate or other suitable salt.

We claim:

1. The process which comprises oxidizing a compound of the formula

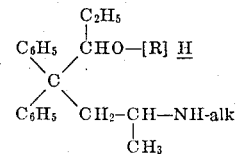

wherein alk is $(C_1-C_3)$ alkyl with permanganate at a neutral pH to produce a compound of the formula;

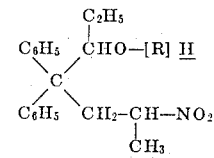

and then reducing said nitro compound to produce a compound of the formula:

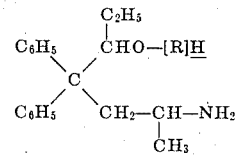

2. The process which comprises oxidizing a compound of the formula

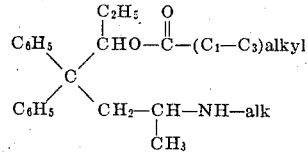

with permanganate at a neutral pH to yield a nitro compound of the formula

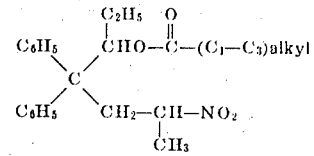

and then reducing said nitro compound by means of an active metal and an acid to produce an O-acyl primary amine of the formula

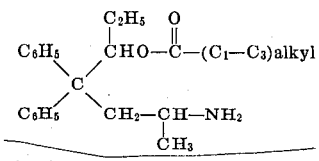

and then continuing to heat said O-acyl primary amine in the presence of a mineral acid until the acyl group is hydrolyzed to yield a compound of the formula

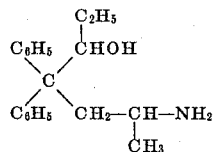

3. In the process of preparing a primary amine of the formula:

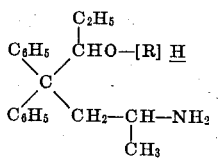

the step which comprises oxidizing a secondary amine of the formula:

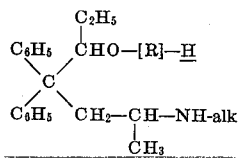

wherein alk is $(C_1-C_3)$alkyl, with permanganate at a neutral pH to yield a nitro compound of the formula:

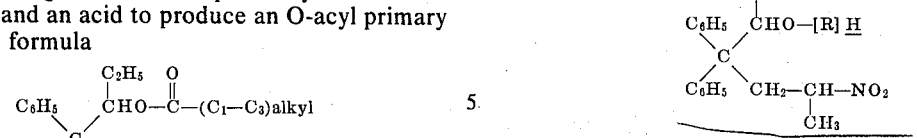

4. The process which comprises oxidizing a compound of the formula

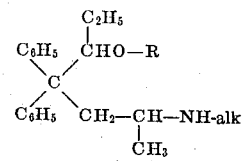

wherein R is H or

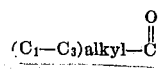

and alk is $(C_1-C_3)$alkyl, with permanganate at a neutral pH to yield a nitro compound of the formula

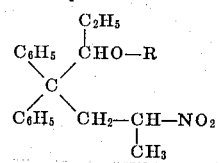

wherein R has the same meaning as above; and then reducing said nitro compound with a metal hydride to yield a primary amine of the formula

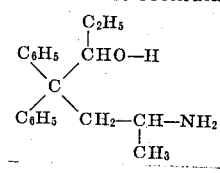

* * * * *

UNITED STATES PATENT AND TRADEMARK OFFICE
CERTIFICATE OF CORRECTION

PATENT NO. : 3,859,354
DATED : January 7, 1975
INVENTOR(S) : Richard N. Booher and Albert Pohland It is certified that error appears in the above—identified patent and that said Letters Patent are hereby corrected as shown below:

Column 2, line 14, in the formula, at the far right, "$NO_2$" should read --$NH_2$--.

Column 6, in Claim 1, at the upper far right of each formula, "[R] H" should read -- H --.

Column 7, in Claim 3, at the upper far right of each formula, "[R] H" should read --H--.

Column 8, in Claim 3, at the upper far right of the formula, "[R] H" should read --H--.

Signed and Sealed this

Twenty-fourth Day of August 1976

[SEAL]

Attest:

RUTH C. MASON
Attesting Officer

C. MARSHALL DANN
Commissioner of Patents and Trademarks